Patented July 29, 1952

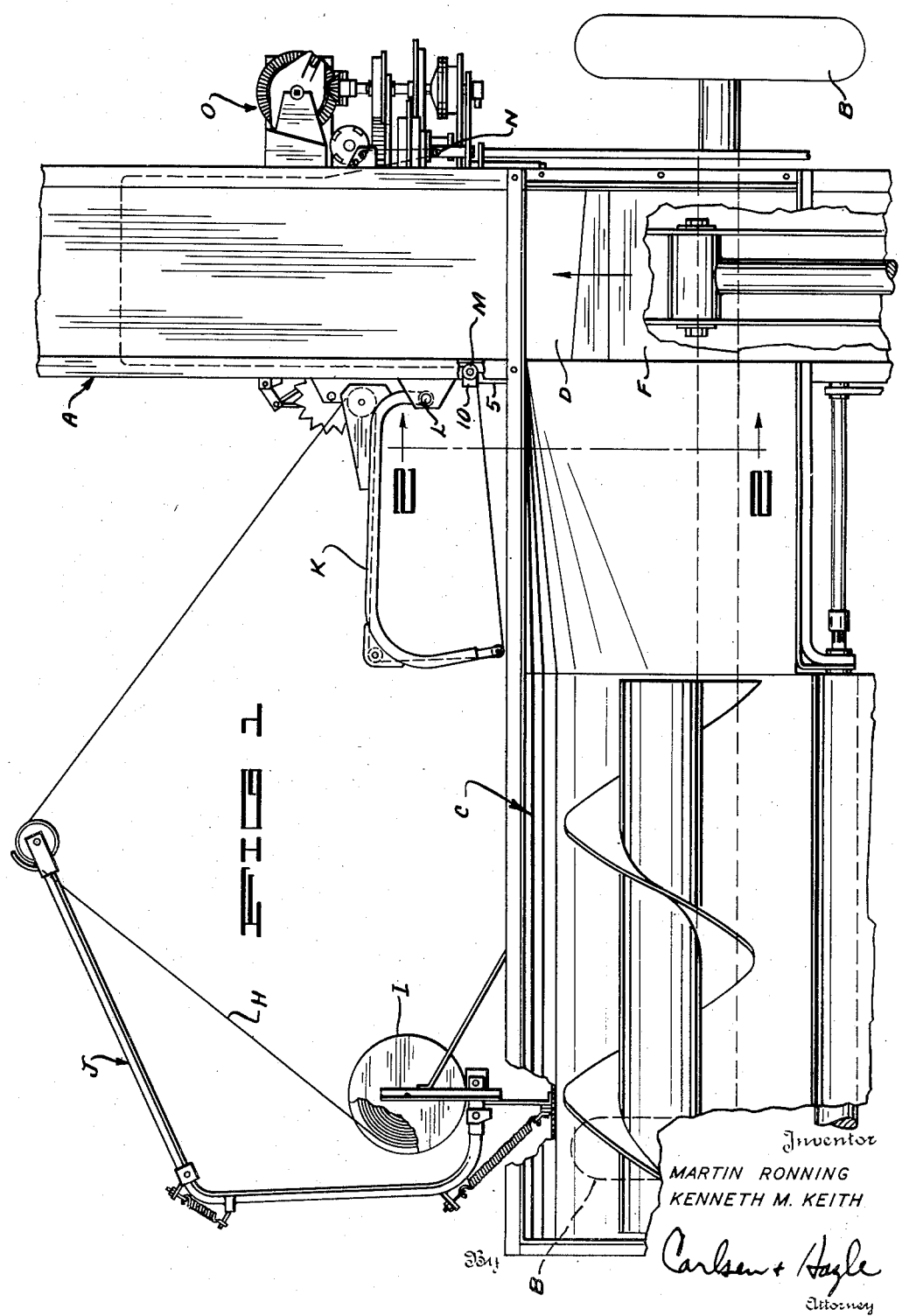

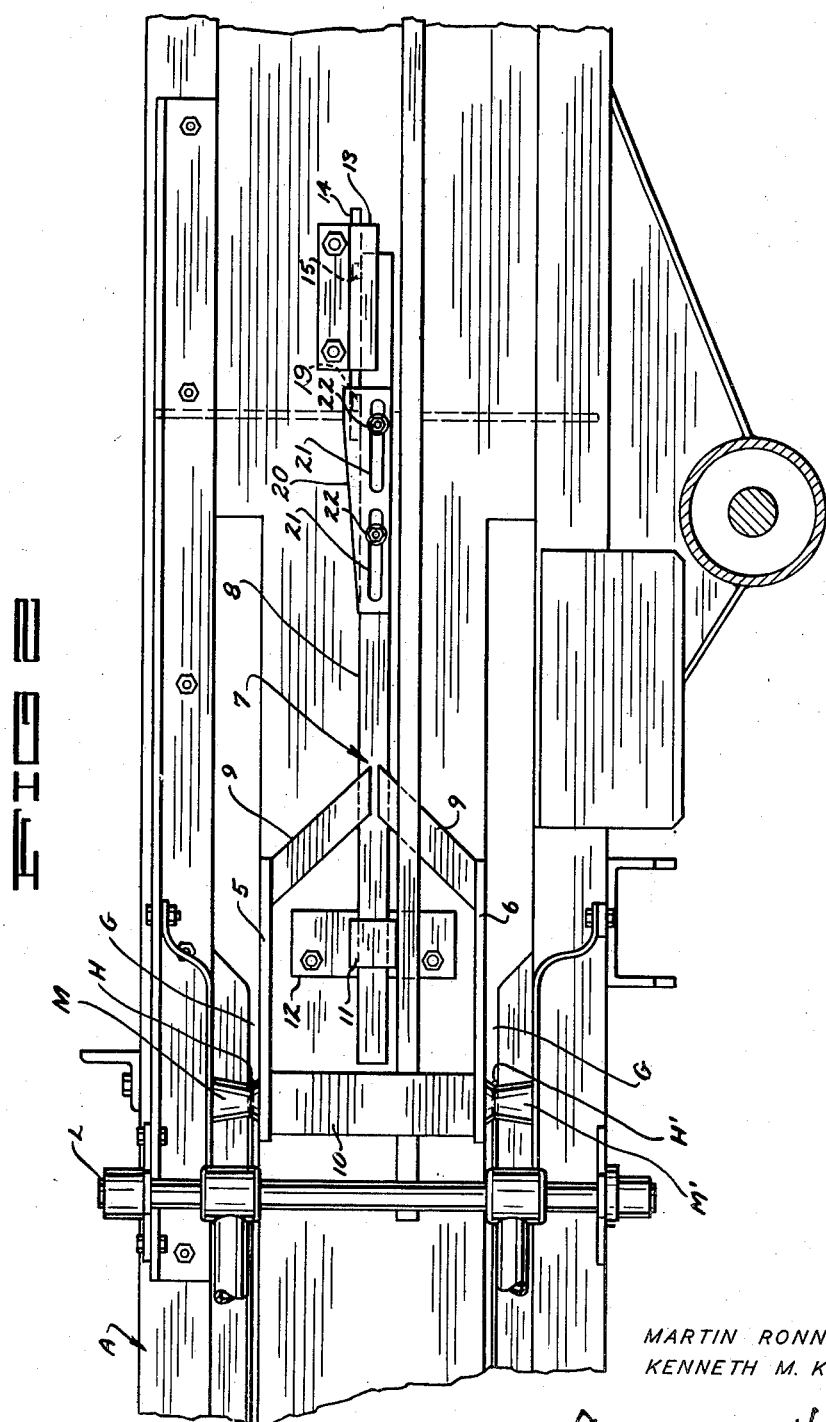

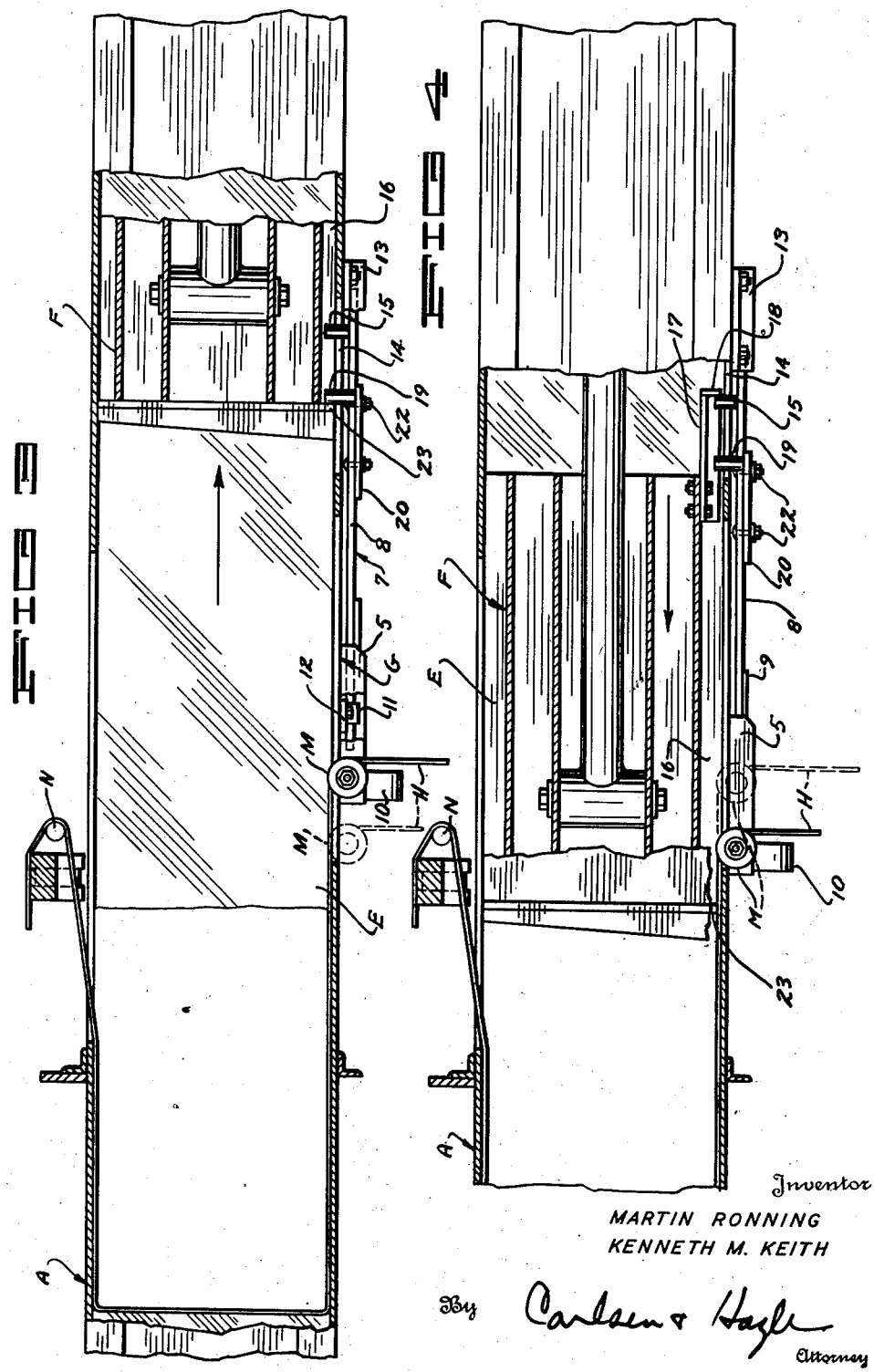

2,604,845

UNITED STATES PATENT OFFICE 2,604,845

WIRE FEED FOR HAY BALERS

Martin Ronning, St. Louis Park, and Kenneth M. Keith, Minneapolis, Minn., assignors, by mesne assignments, to Minneapolis-Moline Company, Hopkins, Minn., a corporation of Minnesota Application October 25, 1946, Serial No. 705,716

6 Claims. (Cl. 100—22)

This invention relates generally to improvements in automatic tying hay balers and more particularly to improvements in the wire feeding or supply means for the wires used in tying the bales.

This invention further relates to improvements in that type of baler shown in our co-pending application Serial No. 530,796, for Baling Machine, filed April 13, 1944, now Patent 2,548,559. In that baler, the bales are tied by wires taken from continuous lengths and fed into the baling chamber around the bale as it is accumulated therein. During the accumulation of the bale, the baling plunger, of course, periodically forces wads of hay into the chamber and it has been found that the resulting jerks upon the tying wires as these wads are forced home has a tendency to break the wires, or otherwise disarrange the wire feeding mechanism. It is accordingly the primary object of our present invention to provide means to counteract this tendency, and to this end we provide means operated in synchronism with the plunger adapted to periodically pull out wire from the supply or spools and to then slacken the wire thus pulled out as the plunger approaches the accumulating bale. In this manner, we provide slack in the wires and prevent the bale from jerking upon the wires with such force as to break them as previously described.

Another object is to provide a wire pulling mechanism for this purpose which may be readily applied to the machine and which may be adjusted as necessary to vary the length of wire pulled out and then slacked off to feed into the baling chamber.

These and other more detailed and specific objects will be disclosed in the course of the following specification, reference being had to the accompanying drawings, in which—

Fig. 1 is a plan view of a medial portion of a baling machine as shown in our co-pending application previously identified, and showing a part of our present invention as it is applied to such machine.

Fig. 2 is an enlarged fragmentary side elevational and sectional view of the machine, substantially along the lines 2—2 in Fig. 1.

Fig. 3 is a horizontal sectional view through the baling chamber and associated parts shown in Fig. 2 and showing the baling plunger on its return stroke away from the bale.

Fig. 4 is a similar view but showing the plunger on its working stroke adjacent the bale.

Referring now more particularly and by reference characters to the drawing, A designates generally the frame of the baling machine which is supported for travel movement over the field upon wheels B and has means C for picking up hay from the field and depositing it through a feed opening D downward into a baling chamber E formed in the frame A. A baling plunger F is reciprocably mounted in the chamber E for periodic movement from a normal position forward of the feed opening D through a working stroke rearwardly into the baling chamber E to thereby force wads or bunches of hay received from opening D in a rearward direction and compress the hay into bales as will be readily understood. The bales are tied at vertically spaced points by encompassing wires which are fed into one side of the baling chamber through openings G shown in Fig. 2, in which view the tying wires are also indicated at H—H'. While in Figs. 1, 3 and 4 only the uppermost wire H appears, it will be understood that the lower wire H' and all associated supply means therefor are identical to those now to be described for the upper wire H.

The wire H is taken from a continuous length coiled upon a spool I and fed through an anti-backlash mechanism J, and to and through a needle K hinged at L upon the adjacent side of the frame A. The mechanism J forms the subject matter of our co-pending application Serial No. 530,090 for Feed Regulating Means for Tying Mechanisms, filed April 8, 1944, now Patent No. 2,470,724. The wire passing from the swinging end of the needle K is carried inwardly over a guide roller M and at the outset of baling operations is stretched directly across the baling chamber E over a pin N which forms part of a tying mechanism designated generally at O. The tying mechanism holds this end of the wire and it will then be understood as hay is forced into the chamber by the plunger F it will strike the wire where it traverses the baling chamber and will pull wire through the needle K and mechanism J from the spool I as required by the increasing length of the bale. When a bale of the desired length has been accumulated, mechanism not important to the present invention, swings the needle K through the baling chamber to bring a portion of the wire into overlapping engagement with the end held in the tying mechanism O which then twists these overlapping wires together to complete the tying of the bale. The needle then returns to the position shown in Fig. 1 leaving the wire stretched across the baling chamber ready for tying the next bale.

The mechanism thus far described is substantially identical to that disclosed in our prior applications and no further description herein is believed to be necessary. It will be understood, however, that each time the plunger F compresses and forces a wad of hay into the baling chamber, these wads coming in contact with the tying wire will pull the wire into the chamber through the needle K and mechanism J and from the spool I. It is found that there is sufficient resistance through all of these mechanisms to so retard the advance of the wire that the sharp jerks imparted thereto each time the plunger approaches the bale with a new wad of hay sometimes causes the wire to be broken. This is of course extremely undesirable since it is our purpose to provide a baler capable of operation rapidly and effectively without attendance of anyone in connection with the tying of the bales.

In accordance with our invention and particularly as shown in Figs. 2, 3 and 4, we provide means supporting the guide roller M for the upper wire H, and the similar roller M' for the lower wire H', for reciprocating movements in synchronism with the plunger F in such manner as to periodically pull out or develop slack in the wires H—H', and to allow the slack thus accumulated to feed into the baling chamber so evenly and smoothly as to overcome any tendency for breakage of the wires. The rollers M—M' are, as they were in their previous machine, positioned immediately adjacent the wire openings G in the side of the baling chamber and are pivoted on vertical axes to guide the wire rearwardly into the chamber. In this case, however, the rollers are mounted upon upper and lower bars 5—6 forming part of a movable roller support designated generally at 7 and which also includes a center bar 8 from which the bars 5—6 are supported in vertically spaced relation by arms 9. The extremities of the bars 5—6 are braced and held in fixed relation by a vertical tie bar 10. The center bar 8 of the support 7 is slidably mounted at its rear end through a clip or yoke 11 on a bracket 12 secured to the side of the frame forwardly of the needle pivots L and the forward portion of the center bar is held slidably against the frame side by a downwardly overhanging clip 13 secured thereto. This mounting is obviously such that the support 7 may slide back and forth alongside the frame A in a forward and rearward direction and in the same plane as the plunger F moves. Adjacent the clip 12 the side wall of the frame A has a horizontal, elongated slot 14 through which is inwardly and slidably turned an abutment 15 on the forward extremity of the center bar 8. The abutment 15 projects therefrom into the interior of the frame A alongside the baling plunger F which has a longitudinally extending groove 16 to clear the inner end of the abutment. However, there is secured to the end of the plunger remote from the baling face of the plunger a catch member 17 having an end 18 projecting laterally and outwardly and adapted as shown in Fig. 4 to contact the abutment 15 at a certain point during the travel of the plunger toward the bale.

A second abutment 19 is also provided upon the support 7 and extends inwardly, from a mounting plate 20, also through the aforesaid slot 14. The abutment 19 is spaced rearwardly of the abutment 15 but the distance between the two may be adjusted through the provision of elongated slots 21 in the mounting plate 20 to receive bolts 22 by which the said plate is secured to the center bar 8. The abutment 19 also plays loosely in the groove 16 in the adjacent side of the baling plunger F but will be engaged at a certain point in the movement of the plunger away from the bale by the projecting end or corner 23 of the baling face of the plunger as seen in Fig. 3.

In operation, the abutment 19 is so located that as the baling plunger moves on its return stroke forward away from the bale, this abutment will be engaged as described by the plunger end 23 to move the entire support 8 and the rollers M—M' in a forward direction. Since the rollers M—M' engage the tying wires between the baling chamber and the outwardly spaced ends of the needles K this forward movement of the rollers will obviously pull wire through the needles K and off the spools I. Now as the baling plunger approaches the accumulated bale, it will, as it nears the completion of its working stroke, bring the member 17 into engagement with the abutment 15 and move the support 7 in a rearward direction to return the rollers M—M' to their initial position. Thus the wire previously pulled out by the forward movement of the rollers will be freed or slackened and may feed into the baling chamber around the bale with little if any tendency to jerk and break the wire.

It will be observed that the adjustment for the abutment 19 will permit the amplitude of the movement of the rollers M—M' to be adjusted to vary the amount of wire pulled out from the supply. Such adjustments may be desirable according to the quantity of hay fed by each working stroke of the plunger, and according also to the strength or other characteristics of the baling wire in use. It will be noted also that this wire pulling mechanism is applicable to the machine without any extensive alteration thereof and will be positive in its operation once properly installed and adjusted.

It is understood that suitable modifications may be made in the structure as disclosed, provided such modifications come within the spirit and scope of the appended claims. Having now therefore fully illlustrated and described our invention, what we claim to be new and desire to protect by Letters Patent is:

1. The combination in a hay baler including a frame having a baling chamber and reciprocable plunger therein, of means for feeding a wire into the chamber around a bale therein and including a wire supply, a roller engaging the wire adjacent the chamber, a support for the roller, said support being movably mounted on the frame and having abutments adapted for alternate engagement by the plunger to alternately move the roller in one direction to pull wire from the wire supply and in the opposite direction to release the wire pulled into the chamber by the bale.

2. In a hay baler having a frame and a baling chamber therein, a plunger reciprocable in the chamber, means for feeding wire into the chamber around a bale, a guide roller engaging the wire, a support for the guide roller slidably mounted on the frame, spaced abutments on the support, and means on the plunger for alternately engaging the said abutments and moving the support and guide roller in opposite directions as the plunger reaches the ends of its working and return strokes whereby said roller will first pull out wire from said wire feeding means and release the wire thus pulled out as the plunger approaches the bale.

3. In a hay baler having a frame and a baling chamber therein, a plunger reciprocable in the chamber, means for feeding wire into the chamber around a bale, a guide roller engaging the wire, a support for the guide roller slidably mounted on the frame, spaced abutments on the support, means on the plunger for alternately engaging the said abutments and moving the support and guide roller in opposite directions as the plunger reaches the ends of its working and return strokes whereby said roller will first pull out wire from said wire feeding means and release the wire thus pulled out as the plunger approaches the bale, and at least one of said abutments being adjustable toward and away from the other to adjust the distance through which the support and guide roller are moved by the plunger.

4. In a hay baler having a frame and a baling chamber therein, a plunger reciprocably in the chamber, means for feeding wire into the chamber around a bale, a guide roller engaging the wire, a support for the guide roller slidably mounted on the frame, spaced abutments on the support, means adjacent the bale end of the plunger for engaging one of said abutments as the plunger moves away from the bale to thereby move the support in one direction whereby the roller will pull out wire from the wire feeding means, and means adjacent the opposite end of the plunger for engaging the other of said abutments as the plunger approaches the bale and thereby move the support in the opposite direction and causing the roller to release the wire previously pulled out from the wire feeding means.

5. In a hay baler having a frame and a baling chamber therein, a plunger reciprocably in the chamber, means for feeding wire into the chamber around a bale, a guide roller engaging the wire, a support for the guide roller slidably mounted on the frame, spaced abutments on the support, means adjacent the bale end of the plunger for engaging one of said abutments as the plunger moves away from the bale to thereby move the support in one direction whereby the roller will pull out wire from the wire feeding means, means adjacent the opposite end of the plunger for engaging the other of said abutments as the plunger approaches the bale and thereby moving the support in the opposite direction and causing the roller to release the wire previously pulled out from the wire feeding means, and one of the said abutments being adjustable on the said support to thereby regulate the amplitude of movement of the support and roller by the plunger.

6. In a hay baler having a frame with a baling chamber and a plunger reciprocable therein, means for feeding upper and lower wires into the chamber around a bale after it is formed, upper and lower guide rollers engaging the wires where they pass into the chamber, a support frame for said rollers comprising upper and lower bars on which the rollers are respectively journaled and a center bar to which said upper and lower bars are connected, clip members slidably supporting the center bar on the frame, and means connected to said center bar and operating in conjunction with each plunger stroke to reciprocate the support frame and cause the rollers to pull slack in the wires for feeding into the chamber.

MARTIN RONNING.
KENNETH M. KEITH.

REFERENCES CITED

The following references are of record in the file of this patent:

UNITED STATES PATENTS

| Number | Name | Date |
|---|---|---|
| 963,180 | Robbin | July 5, 1910 |
| 1,257,474 | Freeman | Feb. 26, 1918 |
| 1,277,302 | Freeman | Aug. 27, 1918 |

FOREIGN PATENTS

| Number | Country | Date |
|---|---|---|
| 28,994 | Sweden | June 11, 1910 |